(12) United States Patent
Matsusue

(10) Patent No.: US 12,012,469 B2
(45) Date of Patent: *Jun. 18, 2024

(54) FIBROUS CELLULOSE AND METHOD FOR MANUFACTURING THE SAME, AND FIBROUS CELLULOSE COMPOSITE RESIN AND METHOD FOR MANUFACTURING THE SAME

(71) Applicant: Daio Paper Corporation, Ehime (JP)

(72) Inventor: Ikko Matsusue, Ehime (JP)

(73) Assignee: Daio Paper Corporation, Ehime (JP)

( * ) Notice: Subject to any disclaimer, the term of this patent is extended or adjusted under 35 U.S.C. 154(b) by 202 days.

This patent is subject to a terminal disclaimer.

(21) Appl. No.: 17/053,867

(22) PCT Filed: May 24, 2019

(86) PCT No.: PCT/JP2019/020576
§ 371 (c)(1),
(2) Date: Nov. 9, 2020

(87) PCT Pub. No.: WO2019/230573
PCT Pub. Date: Dec. 5, 2019

(65) Prior Publication Data
US 2021/0230312 A1    Jul. 29, 2021

(30) Foreign Application Priority Data

May 31, 2018  (JP) ................. 2018-105605

(51) Int. Cl.
| | | |
|---|---|---|
| *C08B 3/20* | (2006.01) | |
| *C08B 3/12* | (2006.01) | |
| *C08J 5/04* | (2006.01) | |
| *D21H 11/18* | (2006.01) | |
| *D21H 11/20* | (2006.01) | |

(52) U.S. Cl.
CPC .................. *C08B 3/20* (2013.01); *C08B 3/12* (2013.01); *C08J 5/045* (2013.01); *D21H 11/18* (2013.01); *D21H 11/20* (2013.01)

(58) Field of Classification Search
CPC ........... C08B 3/20; C08B 3/112; D23H 11/20; D21H 11/18; C08J 5/045
See application file for complete search history.

(56) References Cited

U.S. PATENT DOCUMENTS 11,634,509 B2 * 4/2023 Matsusue .............. C08L 101/00
524/35

FOREIGN PATENT DOCUMENTS

| | | | |
|---|---|---|---|
| JP | 2010-106251 | 5/2010 | |
| JP | 2011-219571 | 11/2011 | |
| JP | 2011-246615 | 12/2011 | |
| JP | 5030667 | 9/2012 | |
| JP | 2012-201852 | 10/2012 | |
| JP | 2012-229350 | 11/2012 | |
| JP | 2013-136859 | 7/2013 | |
| JP | 2013-159866 | 8/2013 | |
| JP | 2013-189574 | 9/2013 | |
| JP | 2014-105407 | 6/2014 | |
| JP | 2014-193959 | 10/2014 | |
| JP | 5863269 | 2/2016 | |
| JP | 2016-89077 | 5/2016 | |
| JP | 2016-094538 | 5/2016 | |
| JP | 2016-094539 | 5/2016 | |
| JP | 2016-94540 | 5/2016 | |
| JP | 2016-094541 | 5/2016 | |
| JP | 5923370 | 5/2016 | |
| JP | 2016-176052 | 10/2016 | |
| JP | 2016-194186 | 11/2016 | |
| JP | 2017-019976 | 1/2017 | |
| JP | 2017-25338 | 2/2017 | |
| JP | 2017-66274 | 4/2017 | |
| JP | 2018-028174 | 2/2018 | |
| JP | 2019-007117 | 1/2019 | |
| WO | 2012/120971 | 7/2014 | |
| WO | 2013/147063 | 12/2015 | |
| WO | WO-2016108285 A1 * | 7/2016 | ............. A61F 13/15 |
| WO | 2016/143801 | 9/2016 | |
| WO | 2014/087767 | 1/2017 | |
| WO | 2019/156047 | 8/2019 | |

OTHER PUBLICATIONS

International Search Report for PCT/JP2019/020576, mailed Jul. 2, 2019.

* cited by examiner

*Primary Examiner* — Leigh C Maier
*Assistant Examiner* — Everett White
(74) *Attorney, Agent, or Firm* — Andrus Intellectual Property Law, LLP

(57) ABSTRACT

A fibrous cellulose having a high resin reinforcing effect and a method for manufacturing the same, and a fibrous cellulose composite resin having high strength and a method for manufacturing the same. A fibrous cellulose has an average fiber width of 0.1 μm or more, an average fiber length of 0.02 to 3.0 mm, and a fibrillation ratio of 1.0% or more. A kneaded product of this fibrous cellulose and a resin is formed into a fibrous cellulose composite resin. In manufacturing the fibrous cellulose, a raw material fiber is defibrated so as to have an average fiber width of 0.1 μm or more, an average fiber length of 0.02 to 3.0 mm, and a fibrillation ratio of 1.0% or more. The fibrous cellulose obtained by this method and a resin are kneaded to manufacture a fibrous cellulose composite resin.

13 Claims, No Drawings

FIBROUS CELLULOSE AND METHOD FOR MANUFACTURING THE SAME, AND FIBROUS CELLULOSE COMPOSITE RESIN AND METHOD FOR MANUFACTURING THE SAME

CROSS-REFERENCE TO RELATED APPLICATIONS

This application is the U.S. national stage application of International Application PCT/JP2019/020576, filed May 24, 2019, which international application was published on Dec. 5, 2019, as International Publication WO 2019/230573 in the Japanese language. The International Application claims priority of Japanese Patent Application No. 2018-105605, filed May 31, 2018. The international application and Japanese applications are both incorporated herein by reference, in entirety.

TECHNICAL FIELD

The present invention relates to a fibrous cellulose and a method for manufacturing the same, and a fibrous cellulose composite resin and a method for manufacturing the same.

BACKGROUND ART

In recent years, attention has been paid to nanotechnology aimed at micronizing a substance to a nanometer level such that the substance has new physical properties different from conventional properties of the substance. A cellulose fine fiber (cellulose nanofiber) manufactured from pulp, which is a cellulose-based raw material, by a chemical treatment, a pulverization treatment, and the like has excellent strength, elasticity, thermal stability, and the like. Therefore, use thereof in an industrial application as a filter medium, a filter aid, a base material of an ion exchanger, a filler for chromatographic analysis equipment, a filler to be blended in a resin and a rubber, and the like, and use thereof in an application as an agent to be blended in cosmetics such as a lipstick, powder cosmetics, or emulsified cosmetics are expected. In addition, the cellulose nanofiber has excellent aqueous dispersibility, and therefore use thereof in many applications such as a viscosity retention agent for food, cosmetics, a paint, or the like, a strengthening agent for a food raw material dough, a moisture retention agent, a food stabilizer, a low-calorie additive, and an emulsion stabilization aid is expected. At present, it has been proposed to use the cellulose nanofiber as a resin reinforcing material.

However, when the cellulose nanofiber is used as a resin reinforcing material, the cellulose nanofiber irreversibly aggregates due to an intermolecular hydrogen bond derived from a hydroxyl group of a polysaccharide. Therefore, even if the cellulose nanofiber is used as a reinforcing material, a resin reinforcing effect is not sufficiently exhibited disadvantageously because of poor dispersibility of the cellulose nanofiber in a resin.

Therefore, for example, Patent Literature 1 proposes a method for manufacturing a plant fiber-containing resin composition, the method including melt kneading a thermoplastic resin, a plant fiber composition, and a plant fiber modifier to form a composite material, in which plant fibers in the plant fiber composition have an average fiber length of 0.1 to 0.7 mm and an average fiber width of 2 to 15000 nm.

However, according to knowledge of the present inventors, the strength of the resin is not sufficient simply by specifying the average fiber length and the average fiber width. In addition, specifying that the average fiber width is 2 to 15000 nm indicates a too wide range and is substantially synonymous with specifying that fibers are defibrated, and development cannot proceed on the premise of this proposal.

CITATION LIST

Patent Literature

Patent Literature 1: JP 2014-193959 A

SUMMARY OF INVENTION

Technical Problem

Main problems to be solved by the present invention are to provide a fibrous cellulose having a large resin reinforcing effect and a method for manufacturing the same, and a fibrous cellulose composite resin having high strength and a method for manufacturing the same.

Solution to Problem

In order to solve the above problems, the present inventors have applied various treatments to a cellulose nanofiber (cellulose fine fiber), and have sought a method for kneading the cellulose nanofiber and a resin. That is, various studies have performed on the premise of using the cellulose nanofiber. However, when the cellulose nanofiber is formed into a composite material with a resin, the dispersibility in the resin is not sufficient even if hydrophobic modification is performed or a compatibilizer is used, it is difficult to form a sufficient three-dimensional network in the resin, and a sufficient reinforcing effect cannot be obtained. However, in the process of the studies, the present inventors have found that dispersibility in the resin is better when a microfiber cellulose is used as a raw material fiber than when a cellulose nanofiber is used as the raw material fiber, a sufficient three-dimensional network can be formed in the resin, and a good reinforcing effect can be obtained, have acquired knowledge that this is preferable for solving the above problems, and have arrived at the present invention.

In this regard, the above Patent Literature 1 proposes that the average fiber width of plant fibers is 2 to 15000 nm, but this proposal indicates an extremely wide range and includes a cellulose nanofiber. Therefore, it has not been easy to conceive of selecting the microfiber cellulose as a raw material fiber under the flow of the conventional technique of defibrating, that is, thinning a fiber. Nevertheless, the present inventors have arrived at this idea and finally have completed the invention. The following are means for solving the above problems.

A fibrous cellulose having an average fiber width of 0.1 μm or more, an average fiber length of 0.02 to 3.0 mm, and a fibrillation ratio of 1.0% or more.

The fibrous cellulose, in which a part or all of hydroxyl groups in the fibrous cellulose are replaced with functional groups represented by the following structural formula (1) or (2):

[Chemical Formula 1]

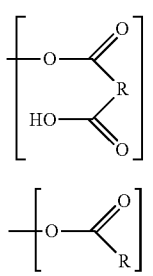

Structural formula (1)

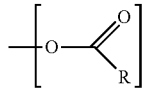

Structural formula (2)

where R in the structural formulas is any one of: a linear, branched, or annular saturated hydrocarbon group or a derivative thereof; a linear, branched, or annular unsaturated hydrocarbon group or a derivative thereof; and an aromatic group or a derivative thereof.

A fibrous cellulose composite resin,
which is a kneaded product of the fibrous cellulose and a resin.

A fibrous cellulose composite resin including
the fibrous cellulose, a resin, and a polybasic acid.

A method for manufacturing a fibrous cellulose, including
defibrating a raw material fiber so as to have an average fiber width of 0.1 μm or more, an average fiber length of 0.02 to 3.0 mm, and a fibrillation ratio of 1.0% or more.

The method for manufacturing a fibrous cellulose, including
modifying the fibrous cellulose with a polybasic acid.

The method for manufacturing a fibrous cellulose, wherein the defibrating is performed with a refiner.

A method for manufacturing a fibrous cellulose composite resin, including
kneading a fibrous cellulose and a resin.

A method for manufacturing a fibrous cellulose composite resin, including
kneading a fibrous cellulose, a resin, and a polybasic acid to modify the fibrous cellulose with the polybasic acid during this kneading.

A method for manufacturing a fibrous cellulose composite resin, including
kneading a fibrous cellulose, a resin, and a polybasic acid to obtain a fibrous cellulose composite resin containing the polybasic acid.

The method for manufacturing a fibrous cellulose composite resin, including
concentrating the fibrous cellulose prior to the kneading.

The method for manufacturing a fibrous cellulose composite resin, including
adding a resin powder to the fibrous cellulose prior to or during the concentration.

Advantageous Effects of Invention

The present invention provides a fibrous cellulose having a high resin reinforcing effect and a method for manufacturing the same, and a fibrous cellulose composite resin having high strength and a method for manufacturing the same.

DESCRIPTION OF EMBODIMENTS

Next, embodiments for carrying out the invention will be described. Note that the present embodiments are examples of the present invention, and the scope of the present invention is not limited to the scope of the present embodiment.

A fibrous cellulose of the present embodiment has an average fiber width of 0.1 μm or more, an average fiber length of 0.02 to 3.0 mm, and a fibrillation ratio of 1.0% or more. In one preferable embodiment, a part or all of hydroxyl groups in cellulose fibers are replaced with functional groups represented by the following structural formula (1) or (2).

[Chemical Formula 1]

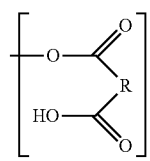

Structural formula (1)

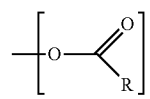

Structural formula (2)

R in the structural formulas is any one of: a linear, branched, or annular saturated hydrocarbon group or a derivative thereof; a linear, branched, or annular unsaturated hydrocarbon group or a derivative thereof; and an aromatic group or a derivative thereof.

A fibrous cellulose composite resin of the present embodiment is a kneaded product of the above fibrous cellulose having a specified average fiber width, average fiber length, and fibrillation ratio and a resin, or a kneaded product of a fibrous cellulose further having a hydroxyl group replaced in addition to the above specified properties and a resin. A fibrous cellulose composite resin of another embodiment contains the above fibrous cellulose having a specified average fiber width, average fiber length, and fibrillation ratio, a resin, and a polybasic acid. Hereinafter, description will be made in order.

(Raw Material Fiber)

A fibrous cellulose having an average fiber width of 0.1 μm or more is a microfiber cellulose, and can be obtained by micronizing (defibrating) a raw material fiber (pulp fiber). As the raw material fiber, one or more kinds can be selected from a plant-derived fiber, an animal-derived fiber, a microorganism-derived fiber, and the like to be used. However, a pulp fiber, which is a plant fiber, is preferably used. When the raw material fiber is a pulp fiber, the pulp fiber is inexpensive and can avoid a problem of thermal recycling.

As the plant-derived fiber, one or more kinds can be selected from a wood pulp made from hardwood, softwood, or the like, a non-wood pulp made from straw, bagasse, or the like, and a waste paper pulp (DIP) made from recovered used paper, waste paper, or the like to be used.

As the wood pulp, one or more kinds can be selected from a chemical pulp such as a hardwood kraft pulp (LKP) or a softwood kraft pulp (NKP), a mechanical pulp (TMP), and a waste paper pulp (DIP) to be used. These pulps are used for papermaking applications, and by using these pulps, existing facilities can be effectively utilized.

Note that the hardwood kraft pulp (LKP) may be a hardwood bleached kraft pulp, a hardwood unbleached kraft pulp, or a hardwood semibleached kraft pulp. Similarly, the softwood kraft pulp (NKP) may be a softwood bleached kraft pulp, a softwood unbleached kraft pulp, or a softwood semibleached kraft pulp.

The waste paper pulp (DIP) may be a magazine waste paper pulp (MDIP), a newspaper waste paper pulp (NDIP), a corrugated waste paper pulp (WP), or another waste paper pulp.

Furthermore, as the mechanical pulp, one or more kinds can be selected from, for example, a stone ground pulp (SGP), a pressure stone ground pulp (PGW), a refiner ground pulp (RGP), a chemiground pulp (CGP), a thermoground pulp (TGP), a ground pulp (GP), a thermomechanical pulp (TMP), a chemithermomechanical pulp (CTMP), a refiner mechanical pulp (RMP), and a bleached thermomechanical pulp (BTMP) to be used.

(Pretreatment Step)

The raw material fiber is preferably pretreated by a chemical method. By performing a pretreatment by a chemical method prior to a micronization (defibration) treatment, the number of times of the micronization treatment can be significantly reduced, and energy of the micronization treatment can be significantly reduced.

Examples of the pretreatment by a chemical method include hydrolysis of a polysaccharide by an acid (acid treatment), hydrolysis of a polysaccharide by an enzyme (enzyme treatment), swelling of a polysaccharide by an alkali (alkali treatment), oxidation of a polysaccharide by an oxidizing agent (oxidation treatment), and reduction of a polysaccharide by a reducing agent (reduction treatment).

By performing an alkali treatment prior to the micronization treatment, a part of hydroxyl groups of a hemicellulose or a cellulose included in a pulp is dissociated, and molecules are anionized to weaken intramolecular and intermolecular hydrogen bonds, resulting in promoting dispersion of pulp fibers in the micronization treatment.

As the alkali, for example, an organic alkali such as sodium hydroxide, lithium hydroxide, potassium hydroxide, an aqueous ammonia solution, tetramethylammonium hydroxide, tetraethylammonium hydroxide, tetrabutylammonium hydroxide, or benzyltrimethylammonium hydroxide can be used. However, sodium hydroxide is preferably used from a viewpoint of manufacturing cost.

When an enzyme treatment, an acid treatment, or an oxidation treatment is performed prior to the micronization treatment, the water retention degree of the microfiber cellulose can be lowered, the crystallinity can be increased, and the homogeneity can be increased. In this regard, it is considered that a lower water retention degree of the microfiber cellulose makes the dispersibility in the resin better, and a higher homogeneity of the microfiber cellulose makes defects that cause destruction of a resin composition less. As a result, it is considered that a resin composition having high strength capable of maintaining the ductility of the resin can be obtained. In addition, the enzyme treatment, the acid treatment, and the oxidation treatment decompose an amorphous region of a hemicellulose or a cellulose included in a pulp. As a result, energy of the micronization treatment can be reduced, and the homogeneity and dispersibility of fibers can be improved. Moreover, when the ratio of a cellulose crystal region, in which it is considered that molecular chains are aligned, rigidity is high, and a water retention degree is low, to the entire fibers is increased, the dispersibility is improved and the aspect ratio is reduced, but a resin composition having high mechanical strength while maintaining ductility can be obtained.

Among the above various treatments, the enzyme treatment is preferably performed, and one or more treatments selected from the acid treatment, the alkali treatment, and the oxidation treatment are more preferably performed in addition to the enzyme treatment. Hereinafter, the alkali treatment will be described in detail.

Examples of a method of the alkali treatment include a method for immersing a raw material fiber in an alkaline solution.

An alkali compound contained in the alkaline solution may be an inorganic alkali compound or an organic alkali compound. Examples of the inorganic alkali compound include a hydroxide of an alkali metal or an alkaline earth metal, a carbonate of an alkali metal or an alkaline earth metal, and a phosphoroxate of an alkali metal or an alkaline earth metal. Examples of the hydroxide of an alkali metal include lithium hydroxide, sodium hydroxide, and potassium hydroxide. Examples of the hydroxide of an alkaline earth metal include calcium hydroxide. Examples of the carbonate of an alkali metal include lithium carbonate, lithium hydrogen carbonate, potassium carbonate, potassium hydrogen carbonate, sodium carbonate, and sodium hydrogen carbonate. Examples of the carbonate of an alkaline earth metal include calcium carbonate. Examples of the phosphoroxate of an alkali metal include lithium phosphate, potassium phosphate, trisodium phosphate, and disodium hydrogen phosphate. Examples of the phosphate of an alkaline earth metal include calcium phosphate and calcium hydrogen phosphate.

Examples of the organic alkali compound include ammonia, an aliphatic amine, an aromatic amine, an aliphatic ammonium, an aromatic ammonium, a heterocyclic compound and a hydroxide thereof, a carbonate, and a phosphate. Specific examples of the organic alkali compound include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium hydrogen carbonate, and diammonium hydrogen phosphate.

A solvent of the alkaline solution may be either water or an organic solvent, but is preferably a polar solvent (water or a polar organic solvent such as an alcohol), and more preferably an aqueous solvent containing at least water.

The pH of the alkaline solution at 25° C. is preferably 9 or more, more preferably 10 or more, and particularly preferably 11 to 14. When the pH is 9 or more, the yield of MFC is high. However, when the pH exceeds 14, handleability of the alkaline solution decreases.

(Micronization (Defibration) Step)

The micronization treatment can be performed by beating a raw material fiber using, for example, a beater, a homogenizer such as a high-pressure homogenizer or a high-pressure homogenizing apparatus, a millstone friction machine such as a grinder or a mill, a single-screw kneader, a multi-screw kneader, or a kneader refiner, and the micronization treatment is preferably performed using a refiner.

The refiner is an apparatus for beating a pulp fiber, and a known refiner can be used. As the refiner, a conical type, a double disc refiner (DDR), and a single disc refiner (SDR) are preferable from a viewpoint of efficiently applying a shearing force to a pulp fiber to promote preliminary defibration, or the like. The refiner is preferably used in the defibration treatment step also from a viewpoint of making separation and washing after the treatment unnecessary.

Note that the microfiber cellulose is a fiber made of a cellulose or a cellulose derivative. An ordinary microfiber cellulose has a strong hydration property and hydrates in an aqueous medium to stably maintain a dispersed state (dispersion state). A plurality of single fibers constituting the microfiber cellulose may aggregate in an aqueous medium to be in a fibrous form.

The micronization (defibration) treatment is performed in such a range that the number average fiber diameter (fiber width, average diameter of single fibers) of the microfiber cellulose is preferably in a range of 0.1 µm or more, more preferably in a range of 0.1 to 15 µm, particularly preferably in a range of 0.2 to 10 µm. The strength of the fibrous cellulose composite resin is improved by performing the micronization (defibration) treatment in such a range that the number average fiber diameter (width) is 0.1 µm or more.

Specifically, when the average fiber diameter is less than 0.1 µm, there is no difference from a case of using a cellulose nanofiber, and a reinforcing effect (particularly flexural modulus) cannot be sufficiently obtained. In addition, the time required for the micronization treatment is long and a large amount of energy is required, which leads to an increase in manufacturing cost. Meanwhile, when the average fiber diameter exceeds 15 µm, the dispersibility of fibers tends to be poor. When the dispersibility of fibers is insufficient, the reinforcing effect tends to be poor.

The average fiber length (length of a single fiber) of the microfiber cellulose is preferably 0.02 to 3 mm, more preferably 0.05 to 2 mm, and particularly preferably 0.1 to 1.5 mm. When the average fiber length is less than 0.02 mm, a three-dimensional network of fibers cannot be formed, and the reinforcing effect may be significantly reduced. Note that the average fiber length can be arbitrarily adjusted by, for example, selection of a raw material fiber, a pretreatment, and a defibration treatment.

In the present embodiment, the ratio of fibers each having a length of 0.2 mm or less in the microfiber cellulose is preferably 12% or more, more preferably 16% or more, and particularly preferably 26% or more. When the ratio is less than 12%, a sufficient reinforcing effect cannot be obtained. The ratio of fibers each having a length of 0.2 mm or less in the microfiber cellulose does not have an upper limit, and all the fibers may each have a length of 0.2 mm or less.

The aspect ratio of the microfiber cellulose is preferably 2 to 30,000, and more preferably 10 to 10,000 in order to improve the mechanical strength while maintaining the ductility of the resin to some extent.

Note that the aspect ratio is a value obtained by dividing an average fiber length by an average fiber width. It is considered that a larger aspect ratio makes the number of caught portions in the resin more to improve the reinforcing effect, but reduces the ductility of the resin because of the many caught portions. Note that it is known that when an inorganic filler is kneaded with the resin, a larger aspect ratio of the filler makes tensile strength higher, but significantly reduces tensile elongation at break.

In the present embodiment, the fibrillation ratio of the microfiber cellulose is preferably 1.0% or more, more preferably 1.5% or more, and particularly preferably 2.0% or more. The fibrillation ratio is preferably 30.0% or less, more preferably 20.0% or less, and particularly preferably 15.0% or less. When the fibrillation ratio is 30.0% or more, the micronization progresses excessively to form a nanofiber, and therefore the intended effect is not necessarily obtained. Meanwhile, when the fibrillation ratio is less than 1.0%, there are few hydrogen bonds between fibrils, and a strong three-dimensional network is insufficient. In this regard, the present inventors have found in a process of various tests that when the fibrillation ratio of the microfiber cellulose is 1.0% or more, fibrils of the microfiber cellulose are hydrogen-bonded to each other to construct a stronger three-dimensional network. The present inventors have also found that a higher fibrillation ratio makes an interface in contact with the resin wider, but use of a polybasic acid as a compatibilizer or for hydrophobic modification further improves the reinforcing effect.

Note that the fibrillation ratio is a value obtained by disintegrating cellulose fibers in accordance with JIS-P-8220: 2012 "Pulp-Disintegration Method" and measuring the obtained disintegrated pulp using FiberLab (Kajaani).

The crystallinity of the microfiber cellulose is preferably 50% or more, more preferably 55% or more, and particularly preferably 60% or more. When the crystallinity is less than 50%, the compatibility with the resin is improved, but the strength of the fiber itself is reduced, and therefore a resin composition reinforcing effect tends to be poor.

Meanwhile, the crystallinity of the microfiber cellulose is preferably 90% or less, more preferably 88% or less, and particularly preferably 86% or less. When the crystallinity exceeds 90%, the ratio of strong hydrogen bonds in a molecule increases and the fiber itself is rigid, but the compatibility with the resin is reduced, and the resin composition reinforcing effect tends to be poor. In addition, it tends to be difficult to chemically modify the microfiber cellulose. Note that the crystallinity can be arbitrarily adjusted by, for example, selection of a raw material fiber, a pretreatment, and a micronization treatment.

The pulp viscosity of the microfiber cellulose is preferably 2 cps or more, and more preferably 4 cps or more. When the pulp viscosity is less than 2 cps, in a case where the microfiber cellulose is kneaded with the resin, the aggregation of the microfiber cellulose cannot be sufficiently suppressed, and the resin composition reinforcing effect tends to be poor.

The freeness of the microfiber cellulose is preferably 500 cc or less, more preferably 300 cc or less, and particularly preferably 100 cc or less. When the freeness exceeds 500 cc, the fiber width of the microfiber cellulose exceeds 15 µm and the reinforcing effect is not sufficient.

(Kneading or the Like)

The microfiber cellulose obtained by the micronization treatment can be dispersed in an aqueous medium to be a dispersion, if necessary. The entire amount of the aqueous medium is particularly preferably water, but an aqueous medium partially containing another liquid having compatibility with water can also be preferably used. As the other liquid, a lower alcohol having 3 or less carbon atoms can be used, for example.

The dispersion is preferably concentrated to adjust a solid concentration thereof. The solid concentration of the dispersion is preferably 1.0% by mass or more, more preferably 1.5% by mass or more, and particularly preferably 2.0% by mass or more. The solid concentration of the dispersion is preferably 70% by mass or less, more preferably 60% by mass or less, and particularly preferably 50% by mass or less. When the solid concentration is less than 1.0% by mass, the solid concentration may be lower than the concentration of the microfiber cellulose aqueous dispersion obtained by the micronization treatment. Meanwhile, when the solid concentration exceeds 70% by mass, it is difficult to dilute the dispersion and disperse the microfiber cellulose thereafter, and it may be difficult to mix the dispersion with a polybasic acid, resin powder, or another composition.

The microfiber cellulose may be dehydrated and dried prior to kneading. The dehydration/drying treatment of the microfiber cellulose may be performed together with the kneading treatment or the like, or does not have to be performed together therewith. The dehydration treatment and the drying treatment may be performed together or separately.

The fibrous cellulose of the present embodiment is or is not modified with a polybasic acid or the like. When the fibrous cellulose is modified with a polybasic acid, the water content (moisture content) of the dehydrated/dried microfiber cellulose is preferably 5% or less, more preferably 3% or less, still more preferably 1% or less, and particularly preferably 0%. When the water content exceeds 5%, the microfiber cellulose is not necessarily modified with a polybasic acid. In addition, a high water content makes energy during kneading enormous, which is not economical.

Meanwhile, when the fibrous cellulose is not modified with a polybasic acid, the water content of the dehydrated/dried microfiber cellulose is preferably more than 5%, more preferably 8% or more, and particularly preferably 10% or more. When the moisture content exceeds 5%, the modification of the cellulose fibers with a polybasic acid does not proceed, and an obtained composite resin contains the polybasic acid.

For the dehydration treatment, one or more kinds can be selected from, for example, a belt press, a screw press, a filter press, a twin roll, a twin wire former, a valveless filter, a center disk filter, a membrane treatment, a centrifuge, and the like to be used.

For the drying treatment, one or more kinds can be selected from, for example, rotary kiln drying, disk drying, air flow drying, medium fluid drying, spray drying, drum drying, screw conveyor drying, paddle drying, single-screw kneading drying, multi-screw kneading drying, vacuum drying, and stirring drying to be used.

A pulverization treatment step may be added after the dehydration/drying treatment step. For the pulverization treatment, one or more kinds can be selected from, for example, a bead mill, a kneader, a disper, a twist mill, a cut mill, and a hammer mill to be used.

The dehydrated/dried microfiber cellulose may be powder-like, pellet-like, sheet-like, or the like. However, the dehydrated/dried microfiber cellulose is preferably powder-like.

When the dehydrated/dried microfiber cellulose is powder-like, the average particle size of the microfiber cellulose is preferably 10,000 to 1 μm, more preferably 5,000 to 10 μm, and particularly preferably 1,000 to 100 μm. When the average particle size exceeds 10,000 μm, the microfiber cellulose cannot necessarily be put in a kneading apparatus because of the large particle size. Meanwhile, when in order to reduce the average particle size to less than 1 μm, energy is required for a pulverization treatment, which is not economical.

When the dehydrated/dried microfiber cellulose is powder-like, the bulk specific gravity of the microfiber cellulose is preferably 1.5 to 0.01, more preferably 1 to 0.04, and particularly preferably 0.5 to 0.1. A bulk specific gravity of more than 1.5 means that the specific gravity of cellulose exceeds 1.5, and therefore it is physically difficult to achieve this. Meanwhile, a bulk specific gravity of less than 0.01 is disadvantageous in terms of transfer cost.

The dehydrated/dried microfiber cellulose may contain a resin. When the dehydrated/dried microfiber cellulose contains the resin, a hydrogen bond between molecules of the dehydrated/dried microfiber cellulose is hindered, and dispersibility in the resin during kneading can be improved. Therefore, this resin can also be added before or after the concentration of the dispersion or the dehydration/drying of the microfiber cellulose described above, or during kneading.

The resin contained in the dehydrated/dried microfiber cellulose may be, for example, powder-like, pellet-like, or sheet-like. However, the resin is preferably powder-like (powdered resin).

When the resin is powder-like, the average particle size of the resin powder contained in the dehydrated/dried microfiber cellulose is preferably 10,000 to 1 μm, more preferably 5,000 to 10 μm, and particularly preferably 1,000 to 100 μm. When the average particle size exceeds 10,000 μm, the resin cannot necessarily be put in a kneading apparatus because of the large particle size. Meanwhile, when the average particle size is less than 1 μm, a hydrogen bond between molecules of the microfiber cellulose cannot be necessarily hindered because of the fineness.

The microfiber cellulose obtained as described above is kneaded with the resin to be a kneaded product. During this kneading, a polybasic acid is further added to modify the cellulose fibers with the polybasic acid, or the kneaded product contains the polybasic acid. Note that the water content (moisture content) of the microfiber cellulose during kneading is important as described above.

As the resin, either a thermoplastic resin or a thermosetting resin can be used.

As the thermoplastic resin, one or more kinds can be selected from, for example, a polyolefin such as polypropylene (PP) or polyethylene (PE), a polyester resin such as an aliphatic polyester resin or an aromatic polyester resin, a polyacrylic resin such as polystyrene, methacrylate, or acrylate, a polyamide resin, a polycarbonate resin, and a polyacetal resin to be used.

However, at least one of a polyolefin and a polyester resin is preferably used. As the polyolefin, polypropylene is preferably used. As the polypropylene, one or more kinds can be selected from, for example, a homopolymer, a random polymer, and a block polymer to be used. Furthermore, examples of the polyester resin include an aliphatic polyester resin such as polylactic acid or polycaprolactone, and an aromatic polyester resin such as polyethylene terephthalate. However, a biodegradable polyester resin (also referred to simply as "biodegradable resin") is preferably used.

As the biodegradable resin, one or more kinds can be selected from, for example, a hydroxycarboxylic acid-based aliphatic polyester, a caprolactone-based aliphatic polyester, and a dibasic acid polyester to be used.

As the hydroxycarboxylic acid-based aliphatic polyester, one or more kinds can be selected from, for example, a homopolymer of a hydroxycarboxylic acid such as lactic acid, malic acid, glucose acid, or 3-hydroxybutyric acid, and a copolymer using at least one of these hydroxycarboxylic acids to be used. However, polylactic acid, a copolymer of lactic acid and any of the above hydroxycarboxylic acids other than lactic acid, polycaprolactone, and a copolymer of at least one of the above hydroxycarboxylic acids and caprolactone are preferably used, and polylactic acid is particularly preferably used.

As this lactic acid, for example, L-lactic acid, D-lactic acid, and the like can be used, and these lactic acids may be used singly or in combination of two or more kinds thereof.

As the caprolactone-based aliphatic polyester, one or more kinds can be selected from, for example, a homopolymer of polycaprolactone and a copolymer of polycaprolactone or the like and the above hydroxycarboxylic acid to be used.

As the dibasic acid polyester, one or more kinds can be selected from, for example, polybutylene succinate, polyethylene succinate, and polybutylene adipate to be used.

The biodegradable resin may be used singly or in combination of two or more kinds thereof.

As the thermosetting resin, for example, a phenol resin, a urea resin, a melamine resin, a furan resin, an unsaturated polyester, a diallyl phthalate resin, a vinyl ester resin, an epoxy resin, a polyurethane-based resin, a silicone resin, or a thermosetting polyimide-based resin can be used. These resins can be used singly or in combination of two or more kinds thereof.

The resin may contain an inorganic filler preferably at a ratio that does not interfere with thermal recycling.

Examples of the inorganic filler include a simple substance of a metal element belonging to Group I to Group VIII of the Periodic Table, such as Fe, Na, K, Cu, Mg, Ca, Zn, Ba, Al, Ti, or a silicon element, an oxide thereof, a hydroxide thereof, a carbonate thereof, a sulfate thereof, a silicate thereof, a sulfite thereof, and various clay minerals formed of these compounds.

Specific examples thereof include barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon, and glass fiber. A plurality of these inorganic fillers may be contained. An inorganic filler contained in a waste paper pulp may be used.

A blending ratio between the microfiber cellulose and the resin is preferably microfiber cellulose:resin=1 part by mass or more:99 parts by mass or less, more preferably 2 parts by mass or more:98 parts by mass or less, and particularly preferably 3 parts by mass or more:97 parts by mass or less.

The blending ratio between the microfiber cellulose and the resin is preferably microfiber cellulose:resin=50 parts by mass or less:50 parts by mass or more, more preferably 40 parts by mass or less:60 parts by mass or more, and particularly preferably 30 parts by mass or less:70 parts by mass or more. However, when the blending ratio of the microfiber cellulose is 10 to 50 parts by mass, the strength of a resin composition, particularly the bending strength thereof and the tensile elastic modulus strength thereof can be significantly improved.

Note that the content ratio between the microfiber cellulose and the resin contained in a finally obtained resin composition is usually the same as the above blending ratio between the microfiber cellulose and the resin.

When the microfiber cellulose is modified, examples of a method therefor include hydrophobic modification such as esterification, etherification, amidation, or sulfidation. However, esterification is preferably adopted as a method for hydrophobically modifying the microfiber cellulose.

Examples of the esterification method include esterification with a hydrophobizing agent such as carboxylic acid, carboxylic acid halide, acetic acid, propionic acid, acrylic acid, methacrylic acid, phosphoric acid, sulfonic acid, polybasic anhydride, or derivatives thereof. However, as the hydrophobizing agent, a polybasic anhydride or a derivative thereof is preferably used.

(Polybasic Acid)

As the polybasic acid to be kneaded with microfiber cellulose and the resin, one or more kinds can be selected from oxalic acids, phthalic acids, malonic acids, succinic acids, glutaric acids, adipic acids, tartaric acids, glutamic acids, sebacic acids, hexafluorosilicic acids, maleic acids, itaconic acids, citraconic acids, citric acids, and the like to be used. However, the polybasic acid is preferably at least one of phthalic acid, phthalates, and derivatives thereof (phthalic acids).

Examples of the phthalic acids (derivatives) include phthalic acid, potassium hydrogen phthalate, sodium hydrogen phthalate, sodium phthalate, ammonium phthalate, dimethyl phthalate, diethyl phthalate, diallyl phthalate, diisobutyl phthalate, dinormal hexyl phthalate, dioctyl phthalate, diisononyl phthalate, diisodecyl phthalate, and ditriisodecyl phthalate. Phthalic acid is preferably used.

As the polybasic anhydrides, one or more kinds can be selected from, for example, maleic anhydrides, phthalic anhydrides, itaconic anhydrides, citraconic anhydrides, and citric anhydrides to be used. However, maleic anhydrides are preferably used, and phthalic anhydrides are more preferably used.

Examples of the phthalic anhydrides include phthalic anhydride, tetrahydrophthalic anhydride, methyltetrahydrophthalic anhydride, methylhexahydrophthalic anhydride, hydroxyphthalic anhydride, hexahydrophthalic anhydride, 4-ethynylphthalic anhydride, and 4-phenylethynyl phthalic anhydride. However, phthalic anhydride is preferably used.

When a polybasic anhydride is used, in a case where the cellulose fibers are modified, a part of hydroxyl groups is replaced with a predetermined functional group, and the compatibility between the microfiber cellulose and the resin is improved. When a polybasic acid is simply contained, the polybasic acid functions as a compatibilizer and improves the compatibility. As a result, the strength of an obtained fibrous cellulose composite resin, particularly the bending strength thereof is improved.

Note that when a polybasic acid functions as a compatibilizer, the degree of progress of modification of the cellulose fibers does not matter, and therefore the quality of an obtained composite resin is stabilized. However, it is necessary to pay attention to the moisture content of the microfiber cellulose during kneading (this point is as described above), for example, such that the cellulose fibers are not modified.

The modification of the microfiber cellulose is preferably performed such that a part of hydroxyl groups of the cellulose constituting the fibers is replaced with a functional group represented by the following structural formula (1) or (2).

[Chemical Formula 1]

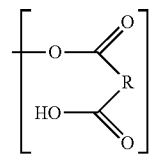

Structural formula (1)

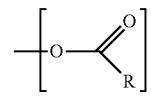

Structural formula (2)

R in the structural formulas is any one of: a linear, branched, or annular saturated hydrocarbon group or a derivative thereof; a linear, branched, or annular unsaturated hydrocarbon group or a derivative thereof; and an aromatic group or a derivative thereof.

As the polybasic anhydride, a compound represented by the following structural formula (3) or (4) is preferably used.
[Chemical Formula 2]

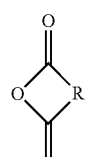

Structural formula (3)

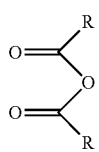

Structural formula (4)

R in the structural formulas is any one of: a linear, branched, or annular saturated hydrocarbon group or a derivative thereof; a linear, branched, or annular unsaturated hydrocarbon group or a derivative thereof; and an aromatic group or a derivative thereof.

By using the polybasic anhydride represented by the structural formula (3) or (4), the compatibility between the microfiber cellulose and the thermoplastic resin is improved.

For the kneading treatment, one or more kinds can be selected from, for example, a single-screw kneader, a multi-screw kneader having two or more screws, a mixing roll, a kneader, a roll mill, a Banbury mixer, a screw press, and a disperser to be used. Among these, a multi-screw kneader having two or more screws is preferably used. One or more multi-screw kneaders each having two or more screws may be used in parallel or in series.

The peripheral speed of the screws of a multi-screw kneader having two or more screws is preferably 0.2 to 200 m/min, more preferably 0.5 to 150 m/min, and particularly preferably 1 to 100 m/min. When the peripheral speed is less than 0.2 m/min, the microfiber cellulose cannot be well dispersed in the resin. Meanwhile, when the peripheral speed exceeds 200 m/min, a shearing force on the microfiber cellulose is excessive, and the reinforcing effect cannot be obtained.

A ratio between the screw diameter of a kneader used in the present embodiment and the length of a kneading part is preferably 15 to 60. When the ratio is less than 15, the kneading part is short, and it may be impossible to mix the microfiber cellulose and the resin. When the ratio exceeds 60, the kneading part is too long, a shearing load on the microfiber cellulose is therefore high, and the reinforcing effect is not necessarily obtained.

The temperature of the kneading treatment is equal to or higher than the glass transition point of the resin and varies depending on the kind of resin, but is preferably 80 to 280° C., more preferably 90 to 260° C., and more preferably 100 to 240° C.

The blending mass ratio of the microfiber cellulose in the composite resin in terms of solid content is preferably 70% to 1%, more preferably 50% to 5%, and particularly preferably 40% to 10%.

When the polybasic acid is used for modification, the blending mass ratio of the polybasic acid in terms of solid content is preferably 0.1 to 50%, more preferably 1 to 30%, and particularly preferably 2 to 20%. The same applies to a case where the polybasic acid functions as a compatibilizer.

During kneading, maleic anhydride polypropylene may be added. The addition amount of maleic anhydride polypropylene is preferably 1 to 1000% by mass, more preferably 5 to 500% by mass, and particularly preferably 10 to 200% by mass with respect to 100% by mass of the blending amount of the microfiber cellulose. When the addition amount is less than 1% by mass, the effect is insufficient. Meanwhile, when the addition amount exceeds 1000% by mass, the addition amount is excessive, and on the contrary, the strength of the resin matrix may be reduced.

During kneading, amines may be added as a method for adjusting the pH of the microfiber cellulose slurry. Examples of the amines include methylamine, dimethylamine, trimethylamine, ethylamine, diethylamine, triethylamine, ethylenediamine, triethanolamine, N,N-dimethylpropan-2-amine, tetramethylethyleneamine, hexamethylamine, spermidine, spermine, amantadine, aniline, phenethylamine, toluidine, catecholamine, 1,8-bis(dimethylamino) naphthalene, pyrrolidine, piperidine, piperazine, morpholine, quinuclidine, pyrrole, pyrazole, imidazole, pyridine, pyridazine, pyrimidine, pyrazine, oxazole, thiazole, and 4-dimethylamino pyridine.

The addition amount of the amines is preferably 1 to 1,000% by mass, more preferably 5 to 500% by mass, and particularly preferably 10 to 200% by mass with respect to 100% by mass of the blending amount of the microfiber cellulose. When the addition amount is less than 1% by mass, pH adjustment is insufficient. Meanwhile, when the addition amount exceeds 200% by mass, the addition amount is excessive, and on the contrary, the strength of the resin matrix may be reduced.

Examples of a solvent used for hydrophobic modification of the microfiber cellulose include no solvent, a protic polar solvent, an aprotic polar solvent, a non-polar solvent, and a resin. However, a resin is preferably used as the solvent. In the present embodiment, the microfiber cellulose is modified when being kneaded with the resin, and therefore the solvent can be substantially eliminated.

Examples of the protic polar solvent include formic acid, butanol, isobutanol, nitromethane, ethanol, methanol, acetic acid, and water.

Examples of the aprotic polar solvent include N-methylpyrrolidone, tetrahydrofuran, ethyl acetate, acetone, dimethylformamide, acetonitrile, dimethylsulfoxide, and propylene carbonate.

Examples of the non-polar solvent include hexane, benzene, toluene, chloroform, diethyl ether, and dichloromethane.

A difference in solubility parameter $(cal/cm^3)^{1/2}$ (SP value) between the microfiber cellulose and the resin can be represented by difference in SP value=$SP_{MFC}$ value–$SP_{POL}$ value, in which the $SP_{MFC}$ value represents an SP value of the microfiber cellulose, and the $SP_{POL}$ value represents an SP value of the resin. The difference in SP value is preferably 10 to 0.1, more preferably 8 to 0.5, and particularly preferably 5 to 1. When the difference in SP value exceeds 10, the microfiber cellulose is not dispersed in the resin, and the reinforcing effect cannot be obtained. Meanwhile, when the difference in SP value is less than 0.1, the microfiber cellulose is dissolved in the resin and does not function as a filler, and the reinforcing effect cannot be obtained. In this regard, the smaller the difference between the $SP_{POL}$ value of the resin (solvent) and the $SP_{MFC}$ value of the microfiber cellulose (solute), the larger the reinforcing effect. Note that the solubility parameter $(cal/cm^3)^{1/2}$ (SP value) is a measure of an intermolecular force acting between a solvent and a solute, and a solvent and a solute having closer SP values have higher solubility.

(Other Compositions)

To the microfiber cellulose, one or more kinds selected from various fine fibers called a cellulose nanofiber, a microfibril cellulose, a microfibrillar fine fiber, a microfilament cellulose, a microfibrillated cellulose, and a super microfibril cellulose can be added, or the microfiber cellulose may contain these fine fibers. In addition, fibers obtained by further micronizing these fine fibers can be added to the microfiber cellulose, or the microfiber cellulose may contain these fibers. However, the ratio of the microfiber cellulose in all the raw material fibers needs to be 10% by mass or more, preferably 30% by mass or more, and more preferably 60% by mass or more.

In addition to the above, fibers derived from plant materials obtained from various plants such as kenaf, jute hemp, manila hemp, sisal hemp, *Diplomorpha sikokiana*, paper birch, *Broussonetia papyrifera*, banana, pineapple, coconut, corn, sugar cane, bagasse, palm, papyrus, reed, esparto, survival grass, wheat, rice, bamboo, various kinds of softwood (cedar, cypress, and the like), hardwood, and cotton can be added to the microfiber cellulose, or the microfiber cellulose may contain these fibers.

As a raw material of the microfiber cellulose composite resin, in addition to the microfiber cellulose and the resin, one or more kinds can be selected from, for example, an antistatic agent, a flame retardant, an antibacterial agent, a colorant, a radical scavenger, a foaming agent, and the like to be used as long as these do not interfere with the effect of the present invention.

These raw materials may be added to the dispersion of the microfiber cellulose, may be kneaded together while the microfiber cellulose is kneaded with the resin, may be kneaded with a kneaded product thereof, or may be kneaded by another method. However, these raw materials are preferably kneaded together while the microfiber cellulose is kneaded with the resin from a viewpoint of manufacturing efficiency.

The resin may contain an ethylene-α-olefin copolymer elastomer or a styrene-butadiene block copolymer. Examples of the α-olefin include butene, isobutene, pentene, hexene, methyl-pentene, octene, decene, and dodecene.

(Molding Treatment)

The microfiber cellulose and the resin (kneaded product) are kneaded again if necessary, and then molded into a desired shape. Note that even if the modified microfiber cellulose is dispersed in the kneaded product, molding processability is excellent.

The size, thickness, shape, and the like of the molding are not particularly limited, and may be, for example, sheet-like, pellet-like, powder-like, or fibrous The temperature during the molding treatment is equal to or higher than the glass transition point of the resin and varies depending on the kind of resin, but is preferably 80 to 280° C., more preferably 90 to 260° C., and particularly preferably 100 to 240° C.

As an apparatus for the molding treatment, one or more kinds can be selected from, for example, an injection molding machine, a blow molding machine, a compression molding machine, an extrusion molding machine, a vacuum molding machine, and a pressure molding machine to be used.

The molding treatment can be performed by a known molding method, for example, by die molding, injection molding, extrusion molding, blow molding, or foam molding. The kneaded product can be spun into fibers and the fibers are mixed with the above-described plant material or the like to be formed into a mat shape or a board shape. Mixing can be performed by, for example, a method for simultaneously depositing the fibers and the plant material or the like with an airlaying process.

Note that this molding treatment can be performed following the kneading treatment, or can be performed by once cooling the kneaded product, forming the kneaded product into chips using a crusher or the like, and then putting the chips into a molding machine such as an extrusion molding machine or an injection molding machine.

Definition of Terms, Measurement Method, and the Like

The terms used herein are as follows unless otherwise specified.

(Average Fiber Diameter)

100 ml of an aqueous dispersion of a microfiber cellulose having a solid concentration of 0.01 to 0.1% by mass is filtered through a Teflon (registered trademark) membrane filter, and solvent substitution is performed once with 100 ml of ethanol and three times with 20 ml of t-butanol. Next, the resulting product is lyophilized and coated with osmium to obtain a sample. This sample is observed with an electron microscope SEM image at a magnification of 5000, 10000, or 30000 depending on the width of a fiber forming the sample. Specifically, two diagonals are drawn on the observation image, and three straight lines passing the intersection of the diagonals are arbitrarily drawn. Furthermore, the widths of 100 fibers in total intersecting the three straight lines are visually measured. Then, the median diameter of the measured values is taken as an average fiber diameter.

(Fiber Analysis)

The average fiber length and the fibrillation ratio are measured with a fiber analyzer "FS5" manufactured by Valmet Corporation.

(Aspect Ratio)

The aspect ratio is a value obtained by dividing the average fiber length by the average fiber width (diameter).

(Crystallinity)

The crystallinity is a value measured by an X-ray diffraction method in accordance with JIS-K0131 (1996) "General rules for X-ray diffraction analysis". Note that the microfiber cellulose has an amorphous portion and a crystalline portion, and the crystallinity means the ratio of the crystalline portion in the entire microfiber cellulose.

(Pulp Viscosity)

The pulp viscosity is measured in accordance with JIS-P8215 (1998). Note that the higher the pulp viscosity, the higher the degree of polymerization of the microfiber cellulose.

(Freeness)

The freeness is a value measured in accordance with JIS P8121-2: 2012.

(Moisture Content (Water Content))

The water content of fibers is a value calculated by the following formula, in which the mass at the time when a sample is held at 105° ° C. for six hours or more using a constant temperature dryer and no change in mass is observed is taken as the mass after drying.

Fiber water content (%)=[(mass before drying−mass after drying)/mass before drying]×100

EXAMPLES

Next, Examples of the present invention will be described, and the action and effect of the present invention will be clarified. That is, it will be clarified, for example, that when a polybasic acid is used, use of a microfiber cellulose (MFC), particularly use of an MFC having a predetermined fibrillation ratio brings about a better resin reinforcing effect than use of a cellulose nanofiber (CNF).

Example 1

To 365 g of an aqueous dispersion of a microfiber cellulose having a solid concentration of 2.75% by weight (a refiner was used for defibration), 7 g of phthalic acid and 83 g of polypropylene powder were added, and the resulting mixture was heated and dried at 105° C. to obtain a mixture. The mixture had a moisture content of less than 10%. The mixture was kneaded with a twin-screw kneader at 180° C. at 200 rpm to obtain a fibrous cellulose composite resin. This composite resin was cut into a cylindrical shape having a diameter of 2 mm and a length of 2 mm with a pelleter, and injection-molded into a rectangular parallelepiped test piece (length 59 mm, width 9.6 mm, thickness 3.8 mm) at 180° C. Table 1 illustrates test results of a bending test for the obtained molded product. Note that an evaluation method in the bending test is as follows.

(Bending Test)

The flexural modulus was measured in accordance with JIS K7171: 2008. In Table, evaluation results are illustrated according to the following criteria.

When the flexural modulus (magnification) of a composite resin is 1.5 times or more, in which the flexural modulus of a resin itself is 1: ○

When the flexural modulus (magnification) of a composite resin is less than 1.5 times, in which the flexural modulus of a resin itself is 1: ×

Other Examples and Comparative Examples

The tests were performed by changing the number of times of the refiner treatment, the fiber width of a fibrous cellulose, the fiber length thereof, the fibrillation ratio thereof, the water content thereof, a blending ratio among fibers (cellulose), phthalic acid, and a resin during kneading, the kind and presence/absence of an added polybasic acid (chemical), and the like as illustrated in Table 1. Results are illustrated in Table 1. Note that the polybasic acid was basically added immediately before kneading, but in Example 9, the polybasic acid was added to a dispersion of a fibrous cellulose.

Discussion

Table 1 indicates that it is more preferable to use MFC than CNF, and the fibrillation ratio is an important factor when a polybasic acid is used.

INDUSTRIAL APPLICABILITY

The present invention can be used as a fibrous cellulose and a method for manufacturing the same, and a fibrous cellulose composite resin and a method for manufacturing the same.

The invention claimed is:

1. A fibrous cellulose having an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%.

2. The fibrous cellulose according to claim 1, wherein a part or all of hydroxyl groups in the fibrous cellulose are replaced with functional groups represented by the following structural formula (1) or (2):

TABLE 1

| | Fibrous cellulose | | | | Fibrous cellulose composite resin | | Bending test |
|---|---|---|---|---|---|---|---|
| | Average fiber width | Average fiber length | Fibrillation ratio | Water content | Cellulose:Chemical:PP | Chemical | |
| Example 1 | 1 μm or more | 1.60 mm | 2.49 | 7.0% | 10:7:83 | Phthalic acid | ○ |
| Example 2 | 1 μm or more | 1.08 mm | 4.06 | 7.2% | 10:7:83 | Phthalic acid | ○ |
| Example 3 | 1 μm or more | 0.65 mm | 5.15 | 7.3% | 10:7:83 | Phthalic acid | ○ |
| Example 4 | 1 μm or more | 0.55 mm | 5.52 | 7.9% | 10:7:83 | Phthalic acid | ○ |
| Example 5 | 1 μm or more | 0.29 mm | 7.12 | 8.5% | 10:7:83 | Phthalic acid | ○ |
| Example 6 | 1 μm or more | 0.20 mm | 8.37 | 8.9% | 10:7:83 | Phthalic acid | ○ |
| Example 7 | 1 μm or more | 0.16 mm | 10.17 | 9.8% | 10:7:83 | Phthalic acid | ○ |
| Example 8 | 1 μm or more | 0.16 mm | 10.17 | 0.1% | 10:7:83 | Phthalic acid | ○ |
| Example 9 | 1 μm or more | 0.16 mm | 10.17 | 9.6% | 10:7:83 | Phthalic anhydride | ○ |
| Example 10 | 1 μm or more | 0.16 mm | 10.17 | 0.1% | 10:7:83 | Phthalic anhydride | ○ |
| Comparative Example 1 | 1 μm or more | 2.10 mm | 0.50 | 9.8% | 10:7:83 | Phthalic acid | × |
| Comparative Example 2 | less than 1 μm | — | — | 9.8% | 10:7:83 | Phthalic acid | × |

[Chemical Formula 1]

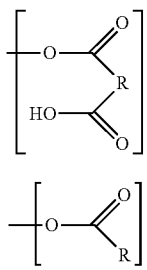

Structural formula (1)

Structural formula (2)

where R in the structural formulas is any one of: a linear, branched, or annular saturated hydrocarbon group or a derivative thereof; a linear, branched, or annular unsaturated hydrocarbon group or a derivative thereof; and an aromatic group or a derivative thereof.

3. The fibrous cellulose of claim 1, wherein a crystallinity of the fibrous cellulose ranges from 50% to 90%.

4. A fibrous cellulose composite resin, which is a kneaded product of a fibrous cellulose having an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%, and a resin.

5. A fibrous cellulose composite resin comprising a fibrous cellulose having an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%, a resin, and a polybasic acid.

6. A method for manufacturing a fibrous cellulose, comprising
defibrating a raw material fiber so as to have an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%.

7. The method for manufacturing a fibrous cellulose according to claim 6, comprising
modifying the fibrous cellulose with a polybasic acid.

8. The method for manufacturing a fibrous cellulose according to claim 6,
wherein the defibrating is performed with a refiner.

9. A method for manufacturing a fibrous cellulose composite resin, comprising
kneading a fibrous cellulose obtained by defibrating a raw material fiber so as to have an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0% with a resin.

10. The method for manufacturing a fibrous cellulose composite resin according to claim 9, comprising
concentrating the fibrous cellulose prior to the kneading.

11. The method for manufacturing a fibrous cellulose composite resin according to claim 10, comprising
adding a resin powder to the fibrous cellulose prior to or during the concentration.

12. A method for manufacturing a fibrous cellulose composite resin, comprising
kneading a fibrous cellulose obtained by defibrating a raw material fiber so as to have an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%, a resin, and a polybasic acid to modify the fibrous cellulose with the polybasic acid during this kneading.

13. A method for manufacturing a fibrous cellulose composite resin, comprising
kneading a fibrous cellulose obtained by defibrating a raw material fiber so as to have an average fiber width of 0.1 μm or more, an average fiber length of 0.02 to 3.0 mm, wherein at least 12% of all fibers have a fiber length of 0.2 mm or less, and a fibrillation ratio ranging from 1.0% to 30.0%, a resin, and a polybasic acid to obtain a fibrous cellulose composite resin containing the polybasic acid.

* * * * *